(12) United States Patent
Lee et al.

(10) Patent No.: US 10,759,252 B2
(45) Date of Patent: Sep. 1, 2020

(54) COOLING AND HEATING SYSTEM OF BATTERY FOR VEHICLE

(71) Applicants: Hyundai Motor Company, Seoul (KR); Kia Motors Corporation, Seoul (KR)

(72) Inventors: Sang Shin Lee, Gyeonggi-do (KR); Man Ju Oh, Gyeonggi-do (KR); So Yoon Park, Gyeonggi-do (KR); Jae Woong Kim, Gyeonggi-do (KR); So La Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 330 days.

(21) Appl. No.: 15/827,935

(22) Filed: Nov. 30, 2017

(65) Prior Publication Data

US 2019/0092118 A1 Mar. 28, 2019

(30) Foreign Application Priority Data

Sep. 28, 2017 (KR) ........................ 10-2017-0125982

(51) Int. Cl.
| | |
|---|---|
| *B60H 1/02* | (2006.01) |
| *B60H 1/00* | (2006.01) |
| *H01M 10/613* | (2014.01) |
| *H01M 10/625* | (2014.01) |
| *B60L 3/00* | (2019.01) |

(Continued)

(52) U.S. Cl.
CPC .......... *B60H 1/00278* (2013.01); *B60L 1/003* (2013.01); *B60L 1/02* (2013.01); *B60L 3/0046* (2013.01); *B60L 50/66* (2019.02); *B60L 58/26* (2019.02); *B60L 58/27* (2019.02); *H01M 10/613* (2015.04); *H01M 10/625* (2015.04); *H01M 10/6561* (2015.04); *H01M 10/663* (2015.04); *B60H 2001/003* (2013.01); *B60L 2240/545* (2013.01); *H01M 2220/20* (2013.01)

(58) Field of Classification Search
CPC ........... H01M 10/6568; H01M 10/625; H01M 10/663; B60H 1/00278; B60H 2001/003; B60L 58/26; B60L 58/27
USPC ........ 454/69–165; 62/61, 239, 241, 243–244
See application file for complete search history.

(56) References Cited

U.S. PATENT DOCUMENTS

| | | | |
|---|---|---|---|
| 5,490,572 A * | 2/1996 | Tajiri | B60H 1/00278 180/65.1 |
| 2015/0079433 A1* | 3/2015 | Tamai | H01M 10/48 429/62 |
| 2016/0129805 A1* | 5/2016 | Garfinkel | B60L 11/1874 180/68.5 |

FOREIGN PATENT DOCUMENTS

KR 10-2012-0066340 6/2012

\* cited by examiner

*Primary Examiner* — Vivek K Shirsat
*Assistant Examiner* — Ko-Wei Lin
(74) *Attorney, Agent, or Firm* — Mintz Levin Cohn Ferris Glovsky and Popeo, P.C.; Peter F. Corless

(57) ABSTRACT

A cooling and heating system of a battery for a vehicle is provided. The system includes a battery module that provides driving energy to the vehicle and an electric component that drives the vehicle using the driving energy of the battery module. An air passage unit of the system includes a radiator disposed therein, a first flow path through which the air passing through the electric component of the vehicle is introduced, a second flow path through which the air passing through the radiator is discharged to the outside of the vehicle, and a door that for selectively opens and closes (Continued)

the first flow path and the second flow path. A controller operates the door to open or close.

13 Claims, 5 Drawing Sheets

(51) Int. Cl.
    *B60L 58/26*          (2019.01)
    *B60L 58/27*          (2019.01)
    *B60L 50/60*          (2019.01)
    *B60L 1/00*           (2006.01)
    *B60L 1/02*           (2006.01)
    *H01M 10/663*        (2014.01)
    *H01M 10/6561*      (2014.01)

-------- Warm air

COOLING AND HEATING SYSTEM OF BATTERY FOR VEHICLE

CROSS REFERENCE TO RELATED APPLICATION

The present application claims priority of Korean Patent Application No. 10-2017-0125982 filed on Sep. 28, 2017, the entire contents of which is incorporated herein for all purposes by this reference.

BACKGROUND

1. Field of the Invention

The present invention relates to a battery cooling and heating system equipped with a battery module for providing driving energy to a vehicle, and more particularly, to a cooling and heating system of a battery for a vehicle, which improve energy efficiency using heat generated and dissipated from an electric component core for heating the battery module.

2. Description of the Prior Art

An electric vehicle equipped with a battery module for supplying driving energy to the vehicle obtains driving energy of a vehicle from electric energy, rather than from combustion of fossil fuel, as in typical vehicles. Although electric vehicles emit no exhaust gas and make minimal noise, the vehicles have not been put to practical use due to problems such as heavy weight of the battery and the time required to charge the battery. However, recently, with the emergence of problems, such as pollution and the depletion of fossil fuels, the development thereof has been accelerated. Particularly, to commercialize electric vehicles, a battery module, which acts as a fuel supply source of an electric vehicle, is required to be lightened in weight and decreased in overall size, and at the same time, the charging time thereof should be decreased.

The battery module includes a plurality of battery cells connected in series. To efficiently charge and discharge the battery module, the battery module is required to be maintained at a proper temperature. Accordingly, a cooling and heating system for a battery is provided which monitors the battery module in real time and performs cooling or heating of the battery module according to the outdoor environment or the environment in which the vehicle is being driven.

However, the battery module and the electric component core share a single radiator in the conventional cooling and heating system for a vehicle battery. In particular, the utilization thereof is limited since the main operational temperature ranges of the battery module and the electric component core are different from each other, and there is a technical limitation in that thermal efficiency is reduced since the battery module is positioned close to devices for air-conditioning the interior of the vehicle.

The description of the technical background above has been made merely for the purpose of helping understanding the background of the present invention, and should not be taken as an admission that the description belongs to the prior art known to those skilled in the art.

SUMMARY

The present invention provides a cooling and heating system of a battery for a vehicle, which may efficiently cool or heat a battery module that provides driving energy of a vehicle.

In order to attain the objective above, a cooling and heating system of a battery for a vehicle, according to the present invention may include: a battery module configured to provide driving energy to the vehicle; an electric component configured to drive the vehicle through the driving energy of the battery module; an air passage unit having a radiator disposed therein and a first flow path through which the air passing through the electric component of the vehicle is introduced, a second flow path through which the air passing through the radiator is discharged to the outside of the vehicle, and a door configured to selectively open and close the first flow path and the second flow path; and a controller configured to adjust the opening and closing of the door.

The air passage unit may be disposed between the electric component and the battery module. In particular, the air passage unit may be disposed between the electric component and a passenger room of the vehicle, and may allow the air introduced into the vehicle to be heated by passing through the electric component and to perform heat exchange in the radiator to heat the battery module using waste heat from the electric component. The air passage unit may further include a third flow path for selectively discharging the air introduced from outside the vehicle or the air introduced from the electric component.

The door may include a first door member and a second door member that share a rotational axis, and the first door member and the second door member may be installed to form a predetermined angle therebetween to allow two airflow paths to be opened simultaneously while one remaining airflow path is closed when the door is rotated. The radiator may selectively exchange heat with air, and the radiator may include a cooling/heating unit having a cooling unit configured to cool the battery module and a heating unit configured to heat the battery module.

The cooling/heating unit may be configured as a closed loop, and the cooling/heating unit may further include a circulation pump driven or stopped by the controller to circulate a heat exchange medium in the cooling/heating unit by driving of the circulation pump to cool or heat the battery module. When the battery module is required to be heated, the controller may be configured to operate the heating unit of the cooling/heating unit, and may be configured to operate the door to close the second flow path and to open the first flow path and the third flow path to communicate with each other to introduce air at a relatively low temperature around the electric component into the first flow path and to discharge air through the third flow path to prevent cool air from flowing into the radiator and to heat the battery module by the heating unit.

When the battery module is required to be heated, the controller may be configured to operate the door to close the second flow path and to open the first flow path and the third flow path to communicate with each other to introduce air at a relatively low temperature around the electric component into the first flow path and to discharge the air through the third flow path to prevent cool air from flowing into the radiator and to heat the battery module using heat generated from the battery module.

When the battery module is required to be heated, the controller may be configured to operate the door to close the third flow path and to open the first flow path and the second flow path to communicate with each other to introduce the air, which has been heated to a relatively high temperature by passing through the electric component, into the first flow path and to discharge the air through the second flow path after performing heat exchange in the radiator to heat the battery module using waste heat of the electric component.

When the battery module is required to be cooled, the controller may be configured to operate the door to close the first flow path and to open the second flow path and the third flow path to communicate with each other to introduce air at a relatively low temperature into the third flow path from outside the vehicle and to discharge the air through the second flow path after performing heat exchange in the radiator to cool the battery module using air from outside the vehicle. When the battery module is required to be cooled, the controller may be configured to operate the cooling unit of the cooling/heating unit, and may be configured to operate the door to close the second flow path and to open the first flow path and the third flow path to communicate with each other to introduce air at a relatively high temperature around the electric component into the first flow path and to discharge the air through the third flow path to prevent a warm air from flowing into the radiator and to cool the battery module by the cooling unit.

The first flow path and the third flow path may be disposed adjacent to each other and may be simultaneously opened by the door to communicate with each other to discharge the air introduced into the air passage unit to the outside of the vehicle without passing through the radiator. The door may be positioned in front of the radiator and the supply of air to the radiator may be allowed or blocked by the door. The cooling/heating unit may further include a cooling fan disposed between the radiator and the battery module.

According to the cooling and heating system for a vehicle battery having the above-described structure, it may be possible to recover waste heat by heating the battery module using waste heat generated from an electric component and a cooling module while the vehicle is being driven. In addition, unlike the prior art, a separate radiator for cooling or heating the battery module is configured to be disposed adjacent to the battery module. Accordingly, it may be possible to reduce weight and cost since pipes constituting flow paths of a heat exchange medium may be minimized. In addition, heat interference may be eliminated and efficiency loss due to wind pressure may be prevented since the system may be separated from an existing cooling module.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a cooling and heating system of a battery for a vehicle, according to an exemplary embodiment of the present invention, will be described with reference to the accompanying drawings.

Figure 1:
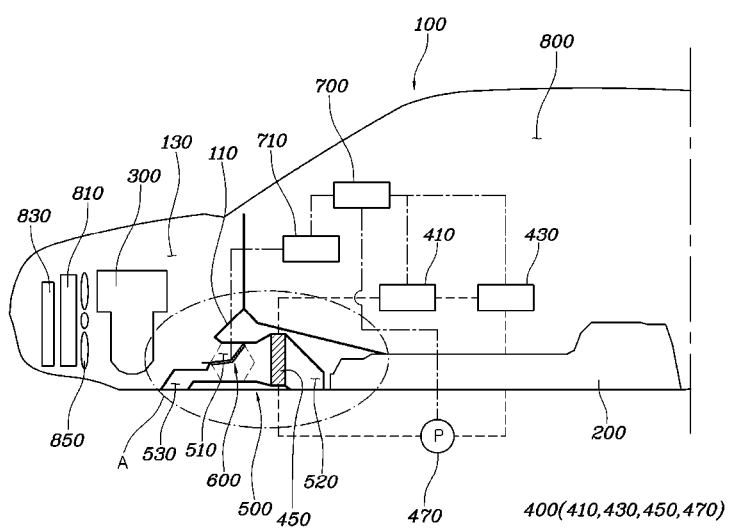
FIG. 1 is a view showing a cooling and heating system of a battery for a vehicle, which is installed in a vehicle, according to a first exemplary embodiment of the present invention.
Figure 2:
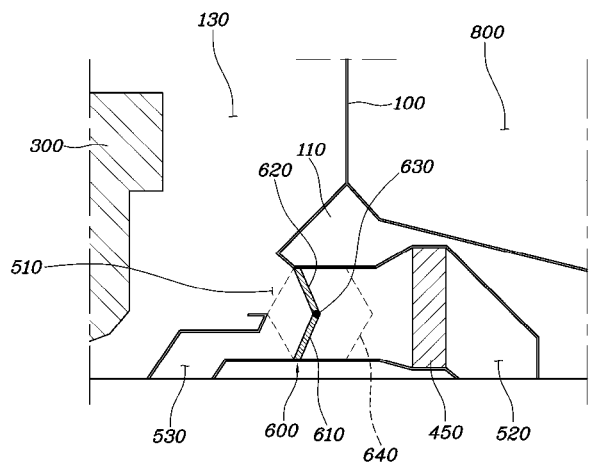
FIG. 2 is a detailed view of a portion A in FIG. 1 according to an exemplary embodiment of the present invention.
Figure 3:
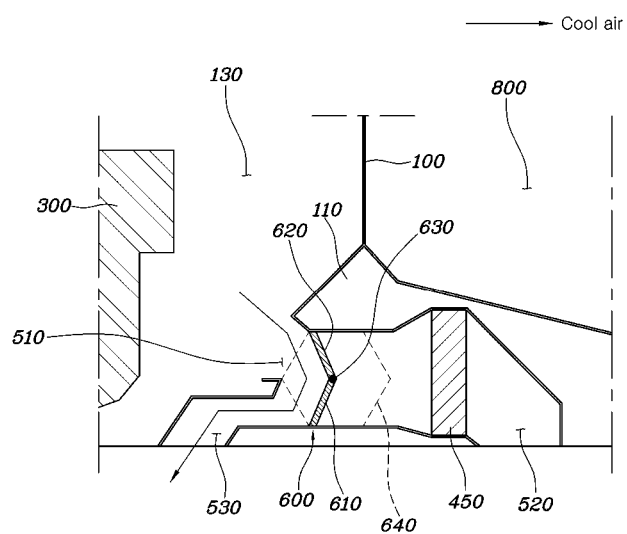
FIGS. 3 and 4 are views showing the operation of a cooling and heating system when a battery module is heated according to an exemplary embodiment of the present invention.
Figure 4:
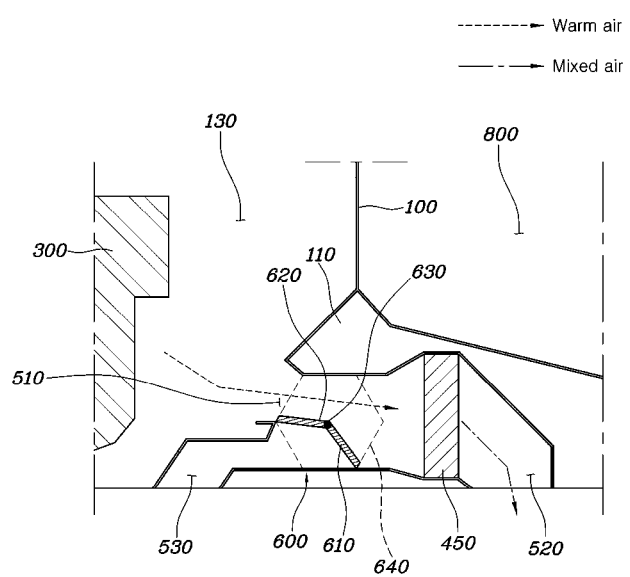
Figure 5:
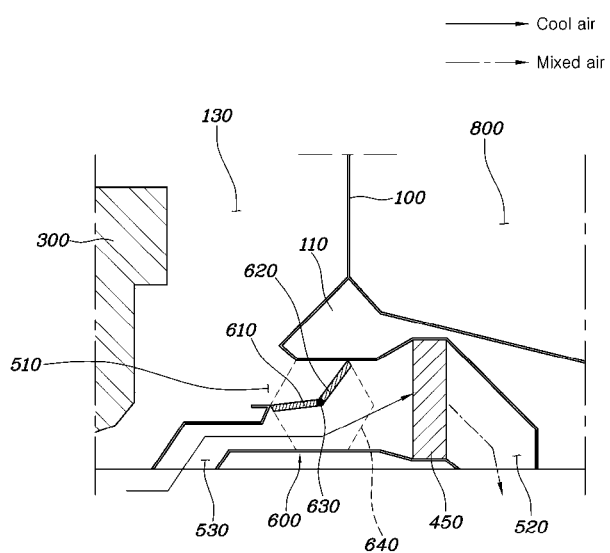
FIGS. 5 and 6 are views showing the operation of a cooling and heating system when a battery module is cooled according to an exemplary embodiment of the present invention.
Figure 6:
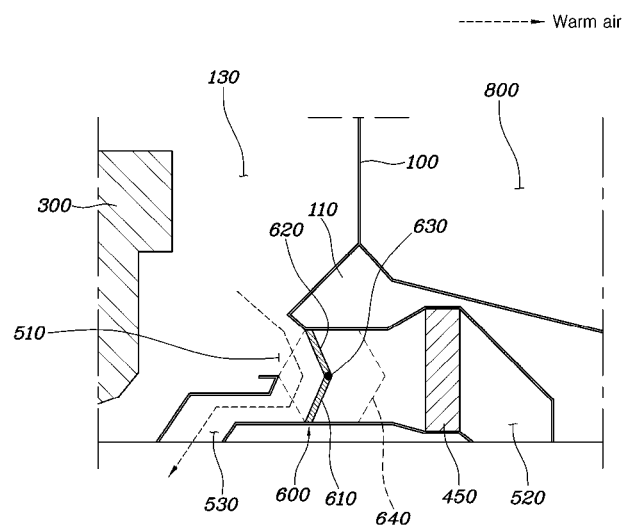
Figure 7:
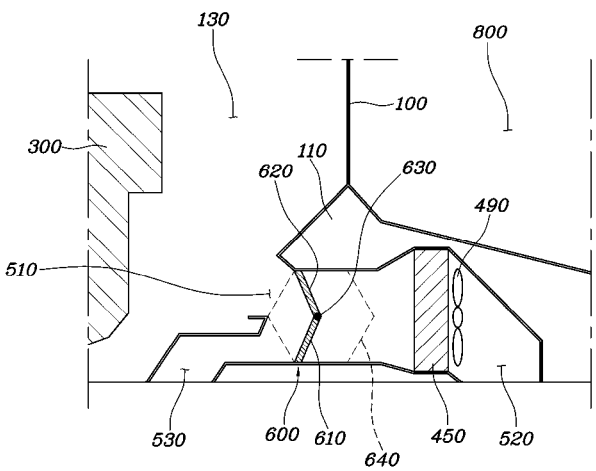
FIG. 7 is a view showing a cooling and heating system of a battery for a vehicle according to a second exemplary embodiment of the present invention.

FIG. 1 is a view showing a cooling and heating system of a battery for a vehicle, which is installed within a vehicle, according to a first exemplary embodiment of the present invention, and FIG. 2 is a detailed view of a portion A in FIG. 1. In addition, FIGS. 3 and 4 are views showing the operation of a cooling and heating system when a battery module 200 is heated, and FIGS. 5 and 6 are views showing the operation of a cooling and heating system when the battery module 200 is cooled. Further, FIG. 7 is a view showing a cooling and heating system of a battery for a vehicle according to a second exemplary embodiment of the present invention.

As shown in FIG. 1, a cooling and heating system for a vehicle battery, according to an exemplary embodiment of the present invention, may include: a battery module 200 configured to provide driving energy to a vehicle; an electric component 300 configured to operate the vehicle using the driving energy of the battery module 200; an air passage unit 500 having a radiator 450 disposed therein, and having a first flow path 510 into which the air passing through the electric component 300 of the vehicle is introduced, a second flow path 520 through which the air passing through the radiator 450 is discharged to the outside of the vehicle, and a door 600 configured to selectively open and close the first flow path 510 and the second flow path 520; and a controller 700 configured to execute the opening and closing of the door 600.

The battery module 200 may be installed in the vehicle to provide driving energy. In particular, when a substantial number of batteries are installed in the form of a module in a vehicle, the batteries may be installed under a floor panel in a chassis 100 to: distribute the center of gravity of the vehicle; secure a stable position; and cool the battery module 200. As described above, although the present invention is illustrated and explained as an example in which: an electric component room 130 is disposed at the position of a typical engine room; the electric component 300 is installed in the electric component room 130; and the battery module 200 is installed under the floor panel of the vehicle, the positions thereof are not limited and the positions of the battery module 200 and the electric component 300 may vary based on the environment or design. In the present specification, a cooling and heating system for a vehicle battery for cooling and heating the battery module 200 will be illustrated and described as an example in which the battery module 200 is installed at such a position.

An electric component room 130, in which the electric component 300 is disposed, may be formed in the front portion of the vehicle with respect to the battery module 200. A radiator 810, a condenser 830, and a cooling fan 850 of an air conditioning system for air-conditioning a passenger room 800 of a vehicle may be disposed in front of the electric component 300, and air is suctioned into the electric component room 130 as the vehicle is driven. In addition, the electric component 300 may be configured to emit heat while the vehicle is being driven. The present invention is a technique for improving energy efficiency by utilizing heat that is generated and dissipated from the electric component 300 to heat the battery module 200.

To cool or heat the battery module 200, a cooling/heating unit 400 may be disposed proximate to the battery module 200. The cooling/heating unit 400 may include a radiator 450 for the battery module 200, configured to selectively exchange heat with air, a cooling unit 430 configured to cool the battery module 200, and a heating unit 410 configured to heat the battery module 200. The cooling/heating unit 400 may be configured as a closed loop, and may further include a circulation pump 470 driven or stopped by a controller 700. In addition, a heat exchange medium may be circulated in the cooling/heating unit 400 by the driving of the circulation pump 470 to cool or heat the battery module 200.

The air passage unit 500 may be disposed between the electric component 300 and the battery module 200. Particularly, the air passage unit 500 may include the radiator 450 disposed therein. The air passage unit 500 may include a plurality of airflow paths. In particular, the air passage unit 500 may include: a first flow path 510 through which air may be introduced from the electric component 300; a second flow path 520 through which the air passing through the radiator 450 may be discharged to the outside of the vehicle; and a third flow path 530 through which the outside air, which is a traveling wind generated while the vehicle is being driven, may be introduced or through which the air introduced from the electric component 300 is selectively discharged Although three airflow paths are illustrated and explained as an example in the present specification, the number of airflow paths is not limited thereto, and additional airflow paths may be adopted or some of them may be removed as necessary.

In addition, the air passage unit 500 may include a door 600 configured to selectively open or close the first flow path 510, the second flow path 520, and the third flow path 530 by operation of the controller 700. The door 600 may be operated by an actuator 710 that is driven by the controller 700. The door 600 may include a first door member 610 and a second door member 620 that share a rotational axis 630, and the first door member 610 and the second door member 620 may be installed to form a predetermined angle therebetween. Therefore, when the door 600 is rotated, two airflow paths among the first flow path 510, the second flow path 520, and the third flow path 530 may be selectively opened at the same time while the one remaining airflow path is closed. Particularly, the door 600 may be installed in a door housing 640 formed in the air passage unit 500.

In particular, the air passage unit 500 may be positioned on the side of the electric component 300 of the vehicle, or may be positioned between the electric component room 130, in which the electric component 300 is installed, and the passenger room 800. The first flow path 510 may be formed in a compartment 110 of the electric component room to heat the air introduced into the vehicle by passing through the electric component 300 and then exchanges heat with the radiator 450. Therefore, the battery module 200 may be heated using waste heat from the electric component 300. More specifically, the door 600 may be positioned in front of the radiator 450 (e.g., between the electric component 300 and the radiator 450) to either allow or block the supply of air to the radiator 450 by the door 600. In particular, the first flow path 510 and the third flow path 530 may be disposed adjacent to each other, and may be opened simultaneously by the door 600 to communicate with each other to discharge the air introduced into the air passage unit 500 to the outside of the vehicle without passing through the radiator 450, thereby improving energy efficiency.

Moreover, the operation of the cooling and heating system of a vehicle battery according to the present invention will be described with reference to the accompanying drawings. FIGS. 3 and 4 are views showing the operation of cooling and heating system when the battery module 200 is heated, and FIGS. 5 and 6 are views showing the operation of a cooling and heating system when the battery module 200 is cooled.

First, FIG. 3 illustrates the case where the battery module 200 is heated. Particularly, FIG. 3 shows the battery module 200 heated by the heating unit 410 of the cooling/heating unit 400 or the battery module 200 heated using heat emitted from the battery module 200. When the battery module 200 is heated using the heating unit 410, the controller 700 may be configured to operate the heating unit 410 of the cooling/heating unit 400, and operate the door 600 to close the second flow path 520 and to open the first flow path 510 and the third flow path 530 to communicate with each other. Therefore, air at a relatively low temperature around the electric component 300 may be introduced into the first flow path 510 and may be discharged through the third flow path 530. Accordingly, a cool air may be prevented from flowing into the radiator 450, and the battery module 200 may be heated by the heating unit 410 operated by the controller 700.

In addition, when the battery module 200 is heated using heat emitted from the battery module 200, the controller 700 may be configured to operate the door 600 to close the second flow path 520 and to open the first flow path 510 and the third flow path 530 to communicate with each other. Accordingly, air at a relatively low temperature around the electric component 300 may be introduced into the first flow path 510 and may be discharged through the third flow path 530, thereby preventing cool air from flowing into the radiator 450. Particularly, since the battery module 200 may be hermetically sealed by the shape of the door housing 640 and the door 600 such that outside air at a relatively low temperature is prevented from flowing into the same, the battery module 200 may be heated using the heat emitted from itself.

FIG. 4 illustrates the battery module 200 heated using waste heat of the electric component 300. When the battery module 200 is heated using waste heat of the electric component 300, the controller 700 may be configured to operate the door 600 to close the third flow path 530 and to open the first flow path 510 and the second flow path 520 to communicate with each other. Therefore, the air, which has been heated to a relatively high temperature by passing through the electric component 300, may be introduced into the first flow path 510 and may be discharged through the second flow path 520 after performing heat exchange in the radiator 450. Accordingly, it may be possible to heat the battery module 200 by consumption power of the driving pump using the waste heat from the electric component 300, without using any additional energy. Particularly, the cooling/heating unit 400 does not use any additional energy since the heating unit 410 is not operated. Thus, it may be possible to heat the battery module 200 while improving the energy efficiency of the vehicle.

FIG. 5 shows the battery module 200 cooled using outside air. When the battery module 200 is cooled using outside air, the controller 700 may be configured to operate the door 600 to close the first flow path 510 and to open the second flow path 520 and the third flow path 530 to communicate with each other. In FIG. 5, the battery module 200 may be cooled using a traveling wind under the floor, which is generated and introduced while the vehicle is being driven. Therefore, air at a relatively low temperature may be introduced into the third flow path 530 from outside the vehicle and may be discharged through the second flow path 520 after performing heat exchange in the radiator 450. As a result, it may be possible to cool the battery module 200 by consumption power of the driving pump using the air outside the vehicle. In particular, the cooling/heating unit 400 does not use any additional energy since the cooling unit 430 is not operated. Accordingly, it may be possible to cool the battery module 200 while maximizing the energy efficiency of a vehicle.

FIG. 6 shows the battery module 200 cooled using the cooling unit 430 of the cooling/heating unit 400. When the battery module 200 is cooled using the cooling unit 430, the controller 700 may be configured to operate the cooling unit 430 of the cooling/heating unit 400 and operate the door 600 to close the second flow path 520 and to open the first flow path 510 and the third flow path 530 to communicate with each other. Therefore, air at a relatively high temperature around the electric component 300, which has been heated by the electric component 300, may be introduced into the first flow path 510 and may be discharged through the third flow path 530. As a result, warm air may be prevented from flowing into the radiator 450, and the battery module 200 may be cooled by the cooling unit 430 operated by the controller 700. Although an air conditioner or a cold exchanger may be adopted as the cooling unit 430 and a heater or a hot exchanger may be adopted as the heating unit 410, the present invention is not limited thereto.

FIG. 7 shows a second exemplary embodiment of the present invention. In the second exemplary embodiment, the cooling/heating unit 400 may further include a cooling fan 490, as shown in FIG. 7. Accordingly, the suction efficiency for the air introduced into the radiator 450 may be increased, and thus, more air may be introduced into the radiator 450 to perform heat exchange, thereby improving heat exchange efficiency. In addition, the cooling fan 490 may be positioned between the radiator 450 and the battery module 200.

Therefore, according to the cooling and heating system of a vehicle battery of the present invention as described above, it may be possible to recover waste heat by heating the battery module using waste heat generated from an electric component and a cooling module while the vehicle is moving. In addition, unlike the prior art, a separate radiator for cooling or heating the battery module may be disposed adjacent to the battery module. Accordingly, it may be possible to reduce weight and costs since pipes of the flow paths of a heat exchange medium may be minimized. Further, heat interference may be eliminated and loss of efficiency due to wind pressure may be prevented since the system is configured to be separated from an existing cooling module.

While the present invention has been illustrated and described with reference to an exemplary embodiment thereof, it will be obvious to those skilled in the art that various modifications and changes thereof can be made without departing from the scope of the invention as defined by the following claims.

What is claimed is:

1. A cooling and heating system of a battery for a vehicle, comprising:
    a battery module configured to provide driving energy to the vehicle;
    an electric component of disposed downstream of a radiator for air-conditioning a passenger room in a front portion of the vehicle and provided upstream of the battery module to drive the vehicle using the driving energy of the battery module;
    an air passage unit including the radiator disposed therein, a first flow path through which air passing through the electric component of the vehicle is introduced, a second flow path through which air passing through the electric component is discharged to an outside of the vehicle, and a door configured to selectively open or close the first flow path and the second flow path; and
    a controller configured to operate the door,
    wherein the air passage unit includes a third flow path configured to selectively discharge air introduced from outside the vehicle or air introduced from the electric component, and
    wherein the door includes a first door member and a second door member that share a rotational axis, and the first door member and the second door member are installed to form a predetermined angle therebetween to simultaneously open two airflow paths while one remaining airflow path is closed when the door is rotated.

2. The system of claim 1, wherein the air passage unit is positioned between the electric component and the battery module.

3. The system of claim 1, wherein the air passage unit is positioned between the electric component and the passenger room of the vehicle, and allows air introduced into the vehicle to be heated by passing through the electric component and to perform heat exchange in the radiator to heat the battery module using waste heat of the electric component.

4. The system of claim 1, wherein the radiator is configured to selectively exchange heat with air, and the radiator includes a cooling/heating unit to cool the battery module and to heat the battery module.

5. The system of claim 4, wherein the cooling/heating unit is a closed loop, and wherein the cooling/heating unit further includes a circulation pump driven or stopped by the controller to circulate a heat exchange medium in the cooling/heating unit by driving of the circulation pump to cool or heat the battery module.

6. The system of claim 4, wherein when the battery module is required to be heated, the controller is configured to operate the heating unit and operate the door to close the second flow path and to open the first flow path and the third flow path to communicate with each other to introduce air at a low temperature around the electric component into the first flow path and to discharge the air through the third flow path to prevent cool air from flowing into the radiator and to heat the battery module by the heating unit.

7. The system of claim 1, wherein when the battery module is required to be heated, the controller is configured to operate the door to close the second flow path and to open the first flow path and the third flow path to communicate with each other to introduce air at a low temperature around the electric component into the first flow path and to discharge the air through the third flow path to prevent cool air from flowing into the radiator and to heat the battery module itself using heat generated by charging or discharging the battery module.

8. The system of claim 1, wherein when the battery module is required to be heated, the controller is configured to operate the door to close the third flow path and to open the first flow path and the second flow path to communicate with each other to introduce the air, which has been heated to a high temperature by passing through the electric component, into the first flow path and to discharge the air through the second flow path after performing heat exchange in the radiator to control the battery module to be heated using waste heat of the electric component.

9. The system of claim 1, wherein when the battery module is required to be cooled, the controller is configured to operate the door to close the first flow path and to open the second flow path and the third flow path to communicate with each other to introduce air at a low temperature into the third flow path from outside the vehicle and to discharge the air through the second flow path after performing heat exchange in the radiator to cool the battery module using air outside the vehicle.

10. The system of claim 4, wherein when the battery module is required to be cooled, the controller is configured to operate the cooling unit and operate the door to close the second flow path and to open the first flow path and the third flow path to communicate with each other to introduce air at a high temperature around the electric component into the first flow path and to discharge the air through the third flow path to prevent warm air from flowing into the radiator and to cool the battery module.

11. The system of claim 1, wherein the first flow path and the third flow path are disposed adjacent to each other and are opened simultaneously by the door to communicate with each other to discharge air introduced into the air passage unit to the outside of the vehicle without passing through the radiator.

12. The system according to claim 1, wherein the door is positioned in front of the radiator and supply of air to the radiator is allowed or blocked by the door.

13. The system of claim 4, wherein the cooling/heating unit further includes a cooling fan disposed between the radiator and the battery module.

* * * * *